United States Patent
Camenzind et al.

(10) Patent No.: US 7,886,442 B2
(45) Date of Patent: Feb. 15, 2011

(54) POCKET KNIFE WITH A WEIGHING ELEMENT

(75) Inventors: Lorenz Camenzind, Lucerne (CH); Peter Joder, Kriens (CH); Erich Lerch, Neuenkirch (CH)

(73) Assignee: Flytec AG (CH)

(*) Notice: Subject to any disclaimer, the term of this patent is extended or adjusted under 35 U.S.C. 154(b) by 806 days.

(21) Appl. No.: 10/519,875

(22) PCT Filed: Jun. 25, 2003

(86) PCT No.: PCT/CH03/00416

§ 371 (c)(1),
(2), (4) Date: Mar. 4, 2005

(87) PCT Pub. No.: WO2004/005866

PCT Pub. Date: Jan. 15, 2004

(65) Prior Publication Data

US 2005/0241071 A1      Nov. 3, 2005

(30) Foreign Application Priority Data

Jul. 4, 2002   (CH) .................................. 1172/02

(51) Int. Cl.
    *B26B 3/06* (2006.01)
(52) U.S. Cl. .............................. 30/151; 30/152; 30/155; 30/164
(58) Field of Classification Search ................... 30/155, 30/151, 152, 164; 7/118–119; 177/148, 177/126, 149, 245, 256, 263, 175
See application file for complete search history.

(56) References Cited

U.S. PATENT DOCUMENTS

| 804,947 | A | * | 11/1905 | Hapgood | ..................... | 177/175 |
| 1,642,212 | A | * | 9/1927 | McLaughlin | ............. | 177/25.11 |
| 2,389,108 | A | * | 11/1945 | Thorsson | ..................... | 177/175 |
| 3,557,789 | A | * | 1/1971 | Poitras | ........................ | 604/245 |
| 3,720,275 | A | * | 3/1973 | Chmielewski et al. | ......... | 177/3 |
| 4,014,396 | A | * | 3/1977 | Lohmann et al. | ............ | 177/169 |
| 4,129,190 | A | * | 12/1978 | Lechner | ...................... | 177/155 |
| 4,660,666 | A | * | 4/1987 | Reder et al. | .................. | 177/148 |
| 5,313,376 | A | | 5/1994 | McIntosh | | |
| 5,545,855 | A | * | 8/1996 | Stanfield et al. | .......... | 177/25.13 |
| 5,614,981 | A | | 3/1997 | Bryant et al. | | |
| 5,902,965 | A | * | 5/1999 | Oldendorf et al. | ........ | 177/25.11 |
| 6,069,325 | A | * | 5/2000 | Aoki | .......................... | 177/136 |
| 6,460,433 | B1 | * | 10/2002 | Ackeret et al. | ................ | 81/440 |

FOREIGN PATENT DOCUMENTS

| DE | 479 802 | 7/1929 |
| EP | 0 291 258 | 11/1988 |
| JP | 10-288545 | 10/1998 |
| WO | WO 99/56918 | 11/1999 |

* cited by examiner

*Primary Examiner*—Boyer D. Ashley
*Assistant Examiner*—Omar Flores-Sánchez
(74) *Attorney, Agent, or Firm*—Ostrolenk Faber LLP

(57) ABSTRACT

A pocket knife having at least one pull-out cutting tool or blade, provided on at least one side with a lateral covering covering said knife, and at least three blockable assembly axes which hold together the knife or the cutting tool in a pull-out or retracted position. A weighing element is arranged inside the pocket knife. Said element can be extracted about at least one of the axes or at least one other axis and/or is displaceably mounted during weighing. The weighing element is actively connected to a transmitting device in order to transmit the weight that is to be measured to a measuring sensor.

11 Claims, 8 Drawing Sheets

POCKET KNIFE WITH A WEIGHING ELEMENT

CROSS REFERENCE TO RELATED APPLICATIONS

The present application is a 35 U.S.C. §371 national phase conversion of International Application No. PCT/CH2003/000416 filed 25 Jun. 2003, which claims priority from Swiss patent application No. 1172/02 filed 4 Jul. 2002.

BACKGROUND OF THE INVENTION

The present invention relates to a pocket knife and to a method for weighing a weight by means of a pocket knife.

WO 99/56918 discloses a multifunctional tool, inter alia in the form of a pocket knife, which can be used as a weighing machine. In this case, a weighing element is provided which can be folded out of the pocket knife and on which a weight can be suspended.

The exemplary embodiments described in this international patent application are kept rather general, and in particular the above-mentioned pocket knife, when intended for use as a weighing machine, leaves room for further developments.

SUMMARY OF THE INVENTION

In other words, one object of the present invention is to propose a pocket knife for use as a weighing machine which can be produced in a simple and cost-effective manner which is suitable for mass production.

The invention proposes a pocket knife for use as a weighing machine.

One embodiment proposes a pocket knife, having at least one cutting tool which can be folded out, a side cover covering at least one side of the knife and at least three mounting spindles which hold the knife together and can lock the cutting tool in a folded-in or folded-out position, which pocket knife has a weighing element which is mounted such that it can be folded out about one of the at least three spindles or at least a further spindle and/or such that it can be moved during weighing.

In this case, the weighing element is operatively connected to a transmission arrangement for transmitting the weight to be weighed to a measuring sensor.

The transmission arrangement preferably has a lever-like element which is at least operatively connected to the weighing element in order to transmit the weight to be weighed in a lever-like manner to the measuring sensor.

While the weighing element provided for weighing purposes can be pivoted or folded out of the body of the pocket knife, the lever-like transmission element provided for transmitting the weight to be weighed is a part which remains in the knife, and the measuring sensor, to which the weight to be weighed is transmitted by the transmission element, is preferably a micromechanical silicon sensor.

On the one hand, the weighing element, the transmission element and the measuring sensor can be arranged on a pocket knife plane which is directly covered by the at least one side cover of the pocket knife, in which side cover the evaluation electronics and the display for the measured weight are arranged. In accordance with a further embodiment, the weighing element, the transmission element and the measuring sensor may also be arranged on a plane formed centrally in the pocket knife, further tools such as a bottle opener, a can opener and the like being arranged on the tool and pocket knife planes between the first-mentioned plane and the at least one side cover, having evaluation electronics and display tools, said further tools leaving a through-opening free, which extends transversely to the pocket knife plane, between the measuring sensor and one side cover. Through this opening the connection is made between the measuring sensor and the evaluation electronics. However, the connection between the measuring sensor and the evaluation electronics may also be made by means of a so-called transponder transmission, which means that no physical opening is required.

The invention also proposes a method for weighing a weight by means of a pocket knife of the type defined according to the invention. In this case, the pocket knife is rocked or moved to and fro at least twice by a person carrying out the weighing operation, as a result of which the weighing element, which is mounted such that it can move about one of the at least three mounting spindles of the pocket knife, is moved at least twice through the 90° point, i.e. protruding downwards perpendicular to the longitudinal axis of the pocket knife, a peak value for the weight to be determined being measured at least twice in each case, and these peak values, when averaged, giving the weight to be measured. Evaluation electronics are preferably used to continuously detect the force which is set by the pocket knife moving to and fro, and, in the event of approximately similar peak values, these values or their mean value is/are displayed as the weight to be measured. A further possibility consists in the use of a so-called Hall sensor, in which the position of the weighing member or weighing element is detected. By a single tipping movement of the pocket knife, the Hall sensor detects the exact 90° position of the weighing member in relation to the longitudinal axis of the pocket knife, i.e. that the weighing member protrudes precisely vertically such that it points downwards. At the same time in this 90° position the weight is detected at the measuring sensor. The two values can be coupled, for example, by means of a microprocessor.

BRIEF DESCRIPTION OF THE DRAWINGS

The invention will now be explained in more detail by way of example and with reference to the attached figures, in which.

DESCRIPTION OF A PREFERRED EMBODIMENT

Figure 1:
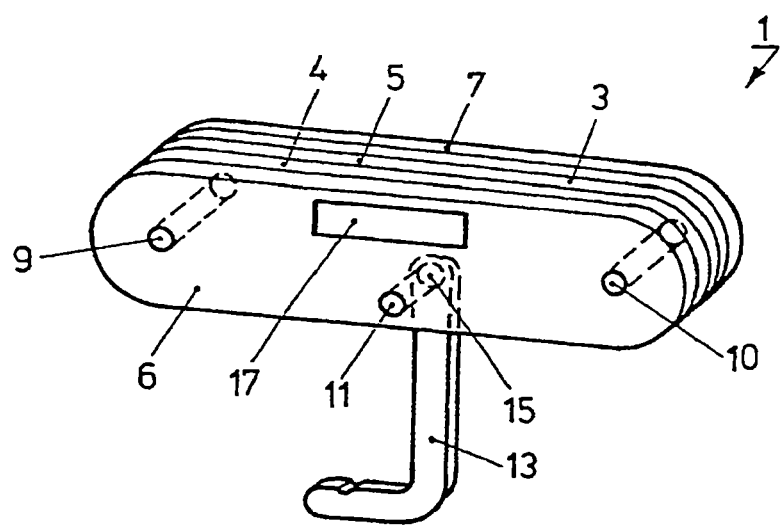
FIG. 1 shows a perspective illustration of a pocket knife according to the invention with the weighing element folded out.

FIG. 1 shows a perspective illustration of a pocket knife 1 according to the invention, having different tools 3, 4 and 5 arranged on different planes, for example knife blades, scissors, awls, bottle openers, can openers etc. The various tool planes are covered on both sides by covers 6 and 7, and the covers and the various tools are held together by at least two longitudinal spindles 9 and 10 which are arranged to the greatest possible extent in the end region. In order for it to be possible for the tools to be positioned such that they can be locked in each case in the folded-in or else in the folded-out state, clamping elements are provided, which have a corresponding longitudinal extent which cannot be seen in FIG. 1, are held on one side in the two end spindles 9 and 10 and are held and clamped by a further spindle 11 extending transversely to the pocket knife. These three spindles 9, 10 and 11 are generally at least provided in pocket knives. If awls, corkscrews and the like are provided, generally at least four mounting, holding and/or locking spindles are provided which extend transversely to the pocket knife plane.

Provided in the pocket knife 1 described according to the invention such that it can pivot about the spindle 11 and such that it is held on said spindle is a weighing element 13 which can be pivoted or folded out of the pocket knife body in the same way as, for example, a blade, in order to be brought into the position illustrated in FIG. 1. A weight, which can be determined using further elements, sensors and the like provided in the pocket knife, can now be suspended on this hook-like weighing element 13. The measured weight can be read off from a display 17 arranged in one of the two side covers 6 and 7. More details will be given below on the internal workings of the pocket knife according to the invention with reference to FIG. 3 and the subsequent figures.

Figure 2:
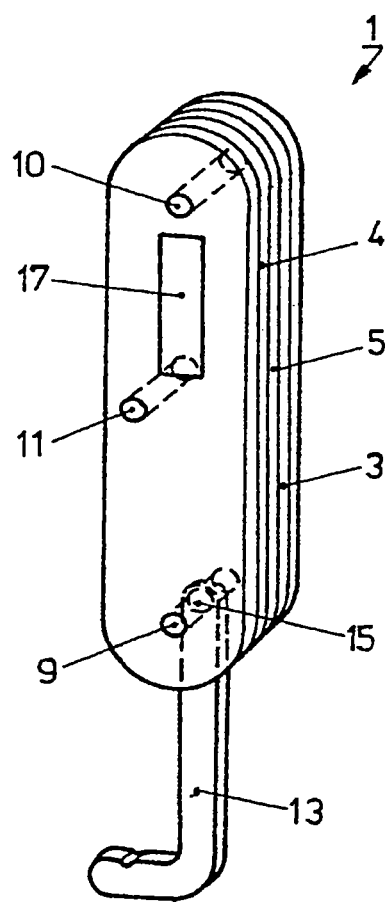
FIG. 2 shows a perspective illustration of a further embodiment of a pocket knife according to the invention with the weighing element folded out.

FIG. 2 shows a further embodiment of a pocket knife according to the invention, where the weighing element 13 is arranged such that it can pivot on one of the two mounting spindles 9 or 10 arranged in the end region instead of on the spindle 11. It is irrelevant per se where the weighing element is arranged, but one of the already existing mounting or holding or locking spindles is preferably used for arranging the weighing element 13.

Figure 3:
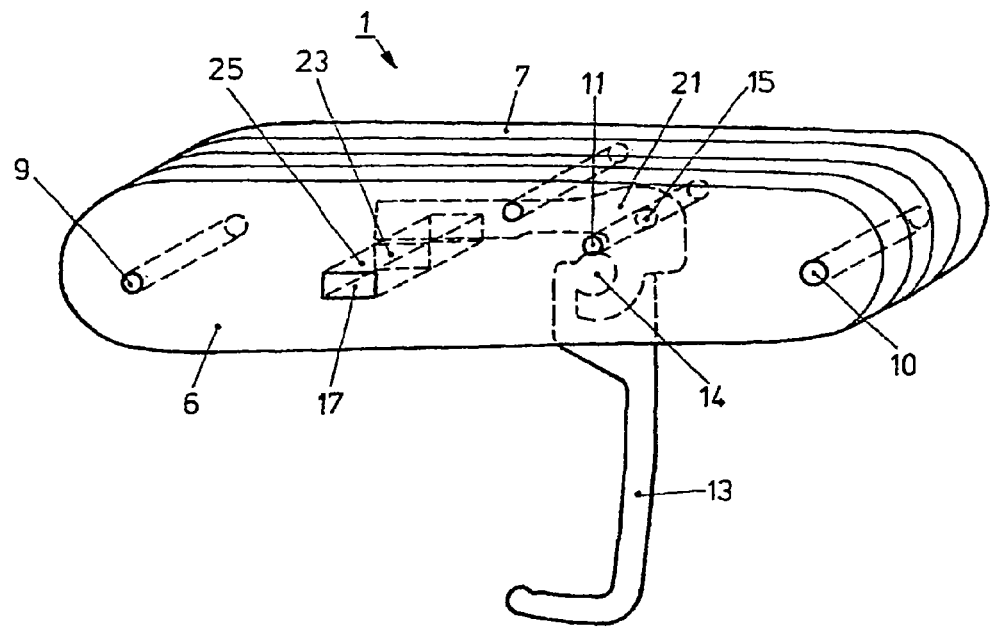
FIG. 3 shows a schematic illustration of the internal workings of a pocket knife according to the invention, showing the elements relevant for the weighing.

FIG. 3 shows a schematic illustration of the internal workings of a pocket knife according to the invention, similar to that shown in FIG. 1. In this case, the weighing element 13 together with a transmission element 21 is mounted on the mounting spindle 11 such that it can move or pivot as freely as possible, with the result that the weight suspended on the weighing element 13 can be transmitted to a measuring sensor 23 via a hinge-like connection 14 and the transmission element 21, arranged in the interior of the pocket knife. The measuring sensor 23 for its part is connected to evaluation electronics 25, which are arranged in the side cover 6. Finally, the determined weight can be read off from a display 17.

Figure 4:
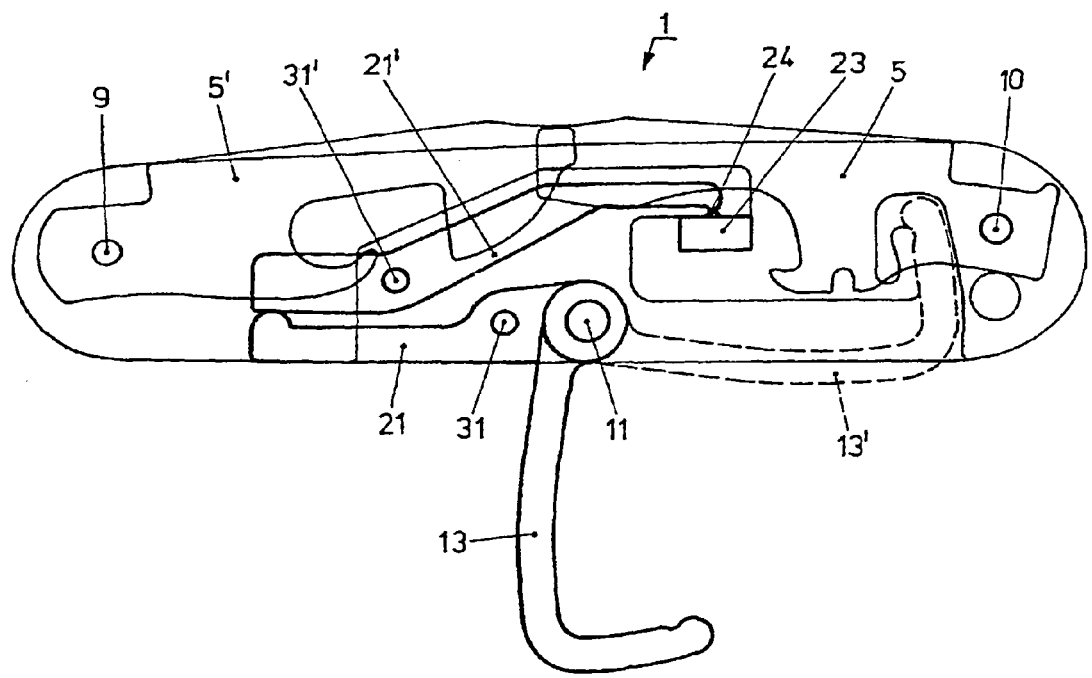
FIG. 4 shows a longitudinal section through the pocket knife plane having elements essential to the weighing.

In the subsequent FIG. 4, a further, possible arrangement is illustrated for transmitting the weight suspended on the weighing element 13 to the measuring sensor 23. In this case, FIG. 4 shows a schematic illustration of a longitudinal section through the pocket knife according to the invention along that plane on which the various elements responsible for weighing and measuring are arranged. In this case, analogously to FIGS. 1 and 3, the measuring element 13, which can be pivoted out of the knife body and is in the form of a hook, is fixed on a spindle 11 extending transversely to the plane. The transverse spindle 11 is in this case coupled to a lever-like transmission element 21 which is fixed such that it can pivot in the manner of a lever about a spindle 31. This transmission element 21 is operatively connected to a further transmission element 21' which is fixed such that it can rotate about a further spindle 31'. This further transmission element 21' finally presses against the measuring sensor 23 via a ball-like element 24, the weight suspended on the measuring element 13 finally being detected by said measuring sensor 23. Also indicated in FIG. 4 are two tools which are conventionally arranged per se in a pocket knife and which are, for example, a can opener or screwdriver 5 and a can opener 5'.

With reference to FIG. 4 it should also be mentioned that the measuring element 13 is also illustrated in the folded-in state and is identified by a dashed leader provided with the reference numeral 13'. It can also be seen from FIG. 4 that the measuring sensor 23 is freely accessible, despite the tools 5 and 5' indicated, at least on one side, that is to say on the side where the tools 5 and 5' indicated are arranged. The arrangement for measuring and transmitting the weight to be measured does not necessarily need to be arranged directly beneath a side cover of the pocket knife but may also be provided in the central region, which is of advantage for accurate measurement. As a result of the fact that a through-opening is free to the side cover owing to the selection of the tools 5 and 5' indicated, wire, contact-pin or contact-tab transmission of the weight detected by the measuring sensor to the evaluation electronics in the corresponding side cover is possible.

Figure 5:
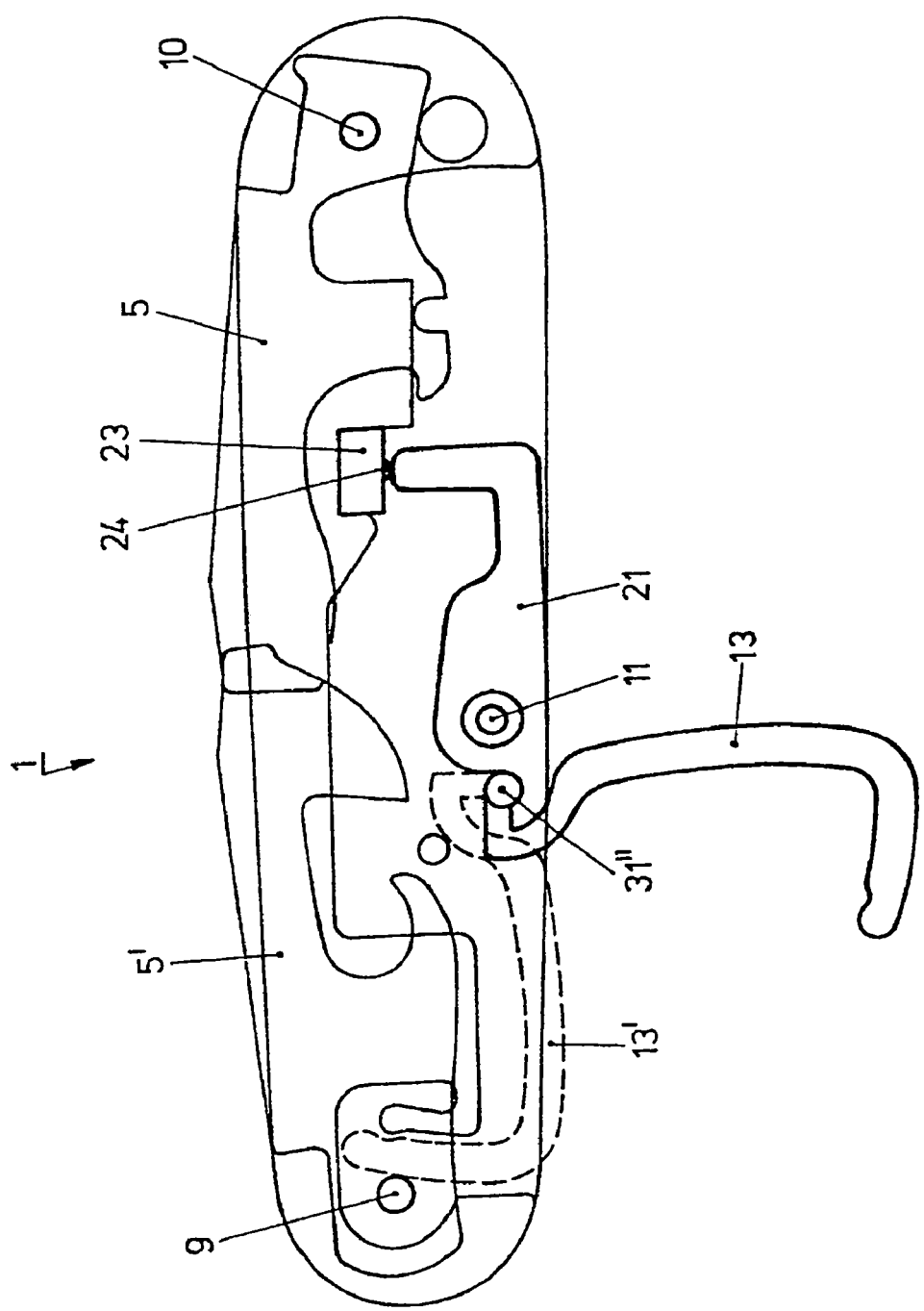
FIG. 5 shows a further arrangement of the elements relevant for determining a weight on the corresponding longitudinal plane of the pocket knife according to the invention.

FIG. 5 in turn shows, using an analogous section, a measuring and transmission arrangement, primarily the transmission element 21 now being mounted such that it can move and rotate about a spindle or mounting spindle 11 of the pocket knife, and the weighing element 13 being fixedly connected to the transmission element 21 such that it can pivot about a further pivot spindle 31". In turn, the weighing element 13 is arranged such that it can rotate into or out of the pocket knife body. If a weight is now suspended on the weighing element 13, the weight is transmitted directly to the transmission element 21 via the pivot spindle 31", and said transmission element 21 transmits the weight to the measuring sensor 23 via an intermediate element 24 owing to the fact that it is mounted such that it can rotate about the spindle 11.

In contrast to the above embodiments, the signal detected by the measuring sensor can also be transmitted to the evaluation electronics in wireless fashion by means of electromagnetic coupling by the measuring sensor 23 containing a coil, and by transmission to the evaluation microprocessor taking place, for example, by means of transponder transmission. The measuring sensor in this case contains passive encoding and/or evaluation electronics. On the one hand, the measurement energy is transmitted to the measuring sensor and the encoding and/or evaluation electronics by means of electromagnetic coupling. The encoding and/or evaluation electronics in this case modulate the transmission energy, which can be evaluated by the sensor. This principle is known as the tag or transponder principle. This embodiment has proved to be particularly advantageous when assembling a pocket knife where it is easily possible for any contact tabs, wires or the like extending from the measuring sensor to the evaluation electronics to be damaged given the relatively rough assembly conditions. This risk is not encountered in the case of wireless transmission.

Figures 6A, 6B:
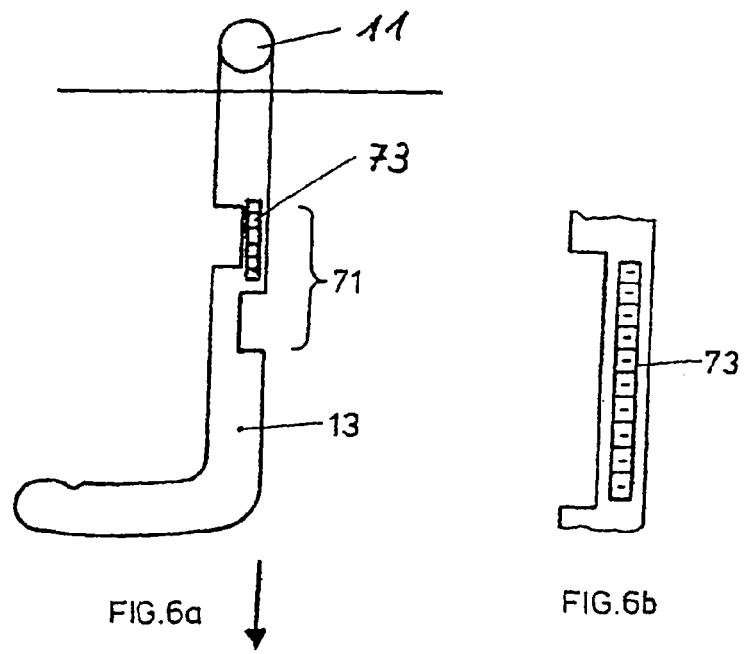
FIG. 6 shows an alternative measuring arrangement in which a measuring sensor is provided directly on the weighing element.

FIG. 6 shows an alternative variant for detecting a weight by means of a pocket knife. FIG. 6 shows only a weighing element in longitudinal section, which is mounted by way of example such that it can be folded out of the pocket knife about the spindle 11. The weight is detected in this case directly at the weighing element by a part 71 being provided which is weaker than the rest of the weighing element. When a weight is suspended on the weighing element 13, the weaker point 71 is extended slightly in the longitudinal direction or in the direction of the arrow, and this extension, as is illustrated schematically in FIG. 6b, is detected, for example, by means of a measuring strip 73. The measuring strip 73 may have the same design as the elongation measuring strip bridge 45, described below with reference to FIG. 7, of a measuring sensor 23. The measured value may in turn be transmitted by means of so-called transponder transmission to evaluation electronics or to the microprocessor in the lateral pocket knife shell, where finally also the detected weight is displayed.

Figure 7:
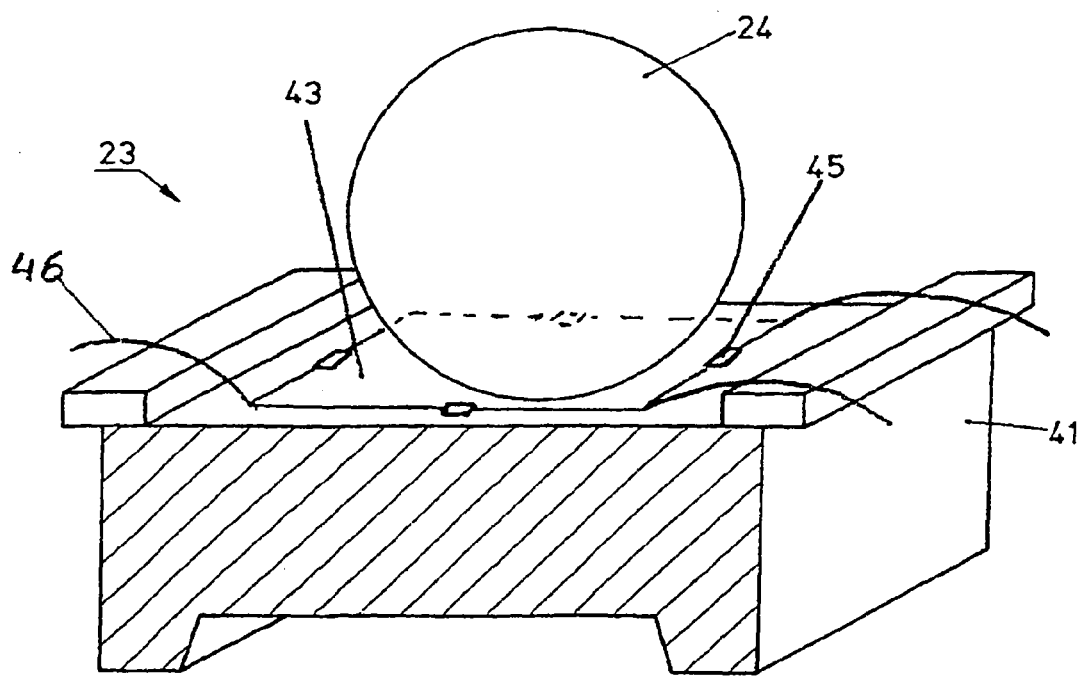
FIG. 7 shows a schematic, perspective illustration of one embodiment of a measuring sensor.

FIG. 7 finally shows an embodiment of a preferred measuring sensor, to be precise of a micromechanical silicon sensor. In this case, the weight transmitted by the transmission element 21 (not illustrated) to an intermediate element 24 is transmitted to the silicon sensor 41, in which measuring resistors 45 in the form of a measuring bridge are arranged. This intermediate element 24 is advantageously a ball-like element. The measuring principle of this micromechanical silicon sensor corresponds to that of elongation measuring strip bridges 45, which are fitted to a silicon chip 43 and have connections 46. The advantages of this measuring technique are as follows:

very short paths (a few μm);
since the silicon is monocrystalline, there is no material fatigue in contrast to conventional sensors on metal;
direct temperature measurement on the same small silicon crystal, thus very accurate evaluation of the measuring bridge possible.

Figure 8A:
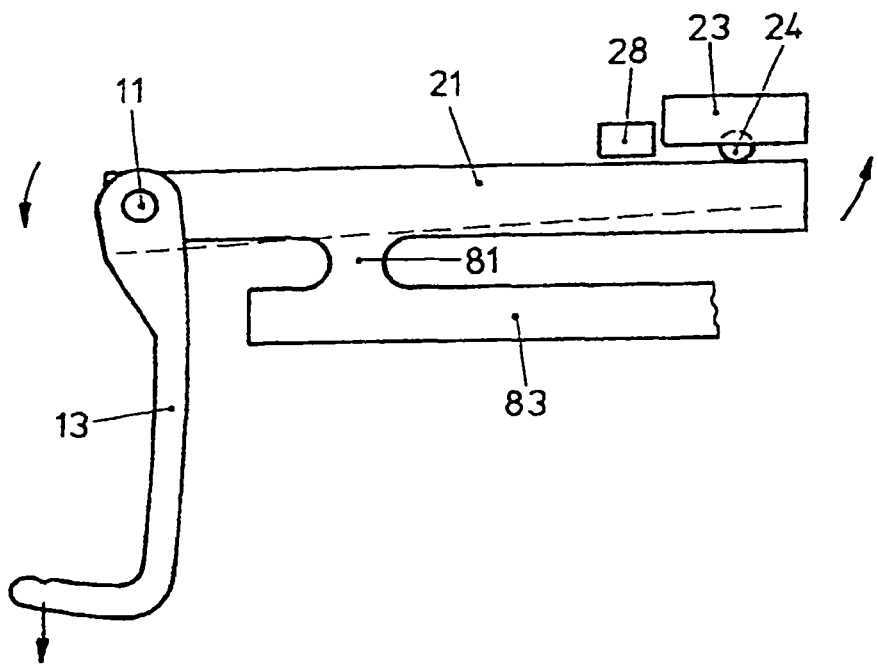
FIG. 8 shows a schematic illustration of an alternative bearing principle for transmitting the weight to be weighed from the weighing element to the measuring sensor.
Figure 8B:
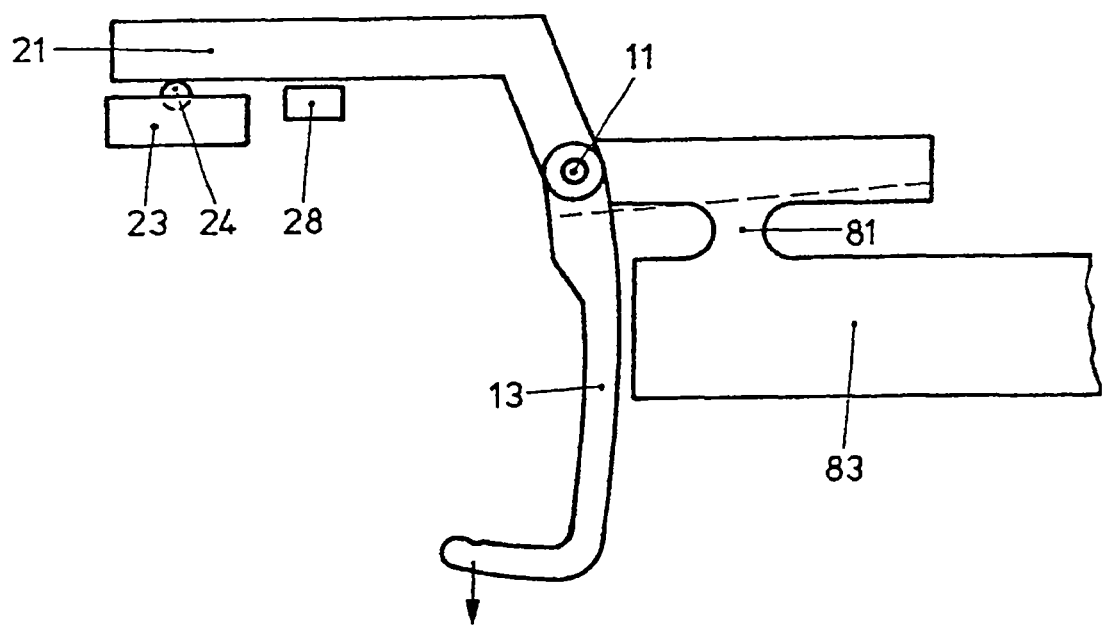

FIGS. 8a and 8b show schematic illustrations of a further variant of the measurement or transmission and mounting principle of the weight to be detected. The suspended weight is transmitted to the measuring sensor 23 via the intermediate element 24 using the measuring element 13 which is connected to a transmission element or transmission lever 21 such that it can rotate freely on a spindle 11. In this case, transmission takes place by means of a tipping movement of the transmission element 21 about a resilient bearing 81 which is formed between the transmission element 21 and a retaining plate 83. The difference between the illustrations in FIGS. 8a and 8b is merely the fact that in one case the retaining plate and the resilient bearing 81 are arranged in FIG. 8a between the weighing element 13 and the sensor 23, whereas in FIG. 8b the bearing 81 is arranged on the transmission element 21 at the end. In order to prevent the measuring sensor 23, such as a silicon sensor, from being damaged, in each case a stop 28 can also be seen in FIGS. 8a and 8b, against which the transmission element 21 rests when the weighing element 13 is subjected to a certain maximum load. This means that the weighing potential is limited, i.e. the measuring device shown in FIGS. 8a and 8b can only be used up to a certain maximum weight.

The significant advantage of transmitting the weight by means of the resilient bearing described is the fact that the bearing is free of lubricant and there is no risk of wear. However, it is important that in the spring system the yield point is never exceeded, with the result that 100° resetting to the starting position is always possible.

On the other hand, there is a certain risk of wear in the arrangements shown in FIGS. 1 to 7 and it is therefore important that the diverse joints are either in the form of friction bearings or of ball bearings or flexural bearings, and that the diverse elements are not mounted such that the detected weight is falsified in any way.

A further essential point is the fact that the weighing force can only be measured correctly when the force is largely at rights angles to the longitudinal axis of the pocket knife. At an angle other than 90° there is a deviation.

Figure 9A:
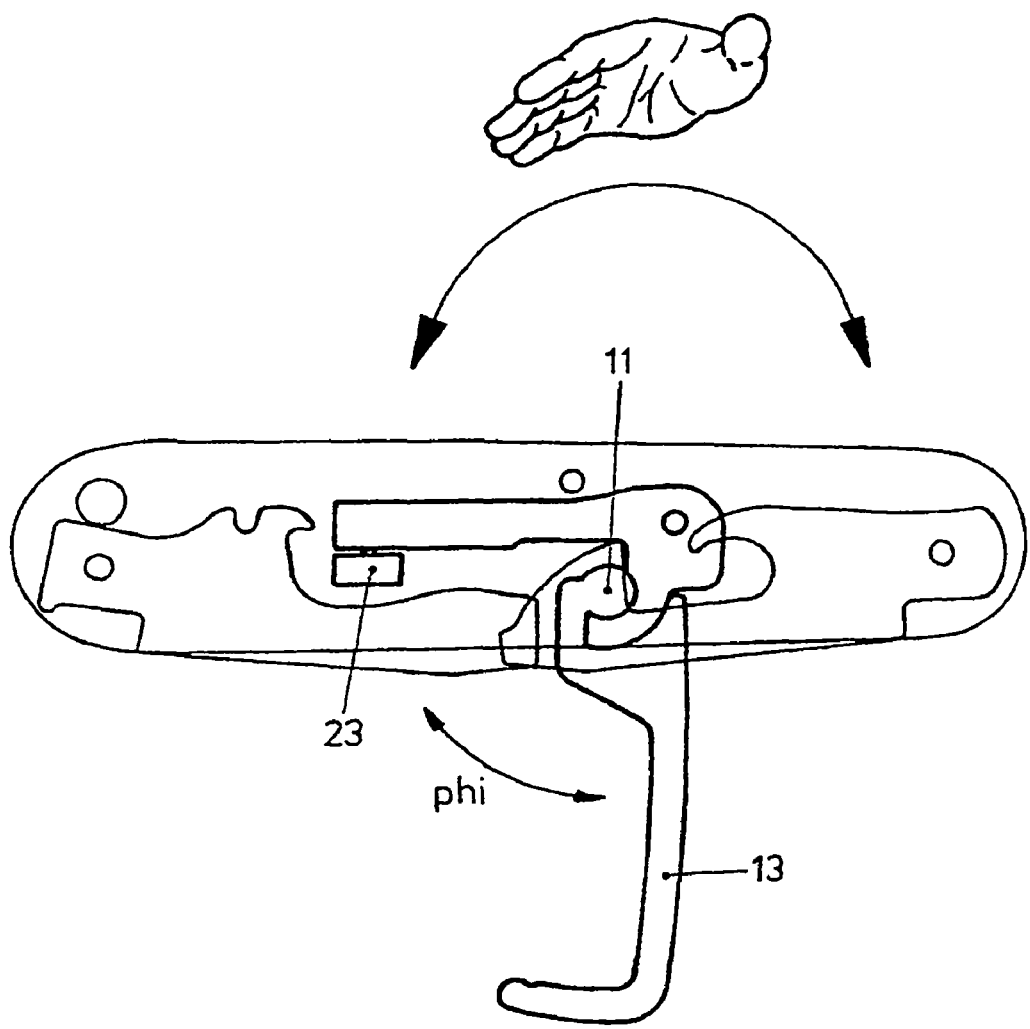
FIGS. 9a and 9b show the compensation of a possible angled position of the measuring element with respect to the longitudinal axis of the pocket knife.
Figure 9B:
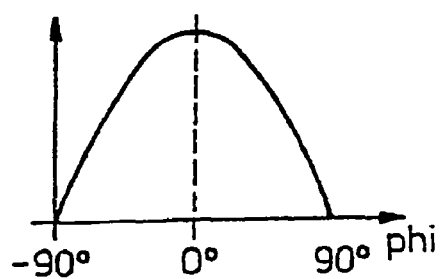

Since it is of course easily possible for the angle not to be precisely 90° when a pocket knife is held, an angled position of the hook must thus be compensated for in some way. This compensation is illustrated schematically in FIGS. 9a and 9b. In principle, the compensation can be corrected by a sine function, as illustrated in FIG. 9b. Compensation may thus be carried out using both electronic and/or mechanical methods.

In accordance with one preferred embodiment, the following procedure is proposed according to the invention. The procedure is a so-called rocking method in which a user moves the pocket knife or the measuring body to and fro at least twice. The weighing element 13 is thus moved to and fro owing to its ability to move as freely as possible about the fixing spindle 11. Evaluation electronics continuously detect the force values. When there has been a pivotal movement twice through the 90° point, i.e. when the weighing hook has passed at least twice through the position extending perpendicularly downwards, there must be two approximately similar peak values for the measured force. These peak values represent the weight to be measured. Small, short instances of interference are filtered out by digital filtering methods. In addition, a plausibility check is carried out.

Either this peak value can then be displayed as the weight on the display 17 or else a mean value for the different peak values can be determined and displayed.

As an alternative to this, however, the angular position of the hook may also be detected. Using, in addition to the measuring sensor 23, a second sensor which can detect the angular position of the hook with respect to the longitudinal extent of the pocket knife, the angle is measured, and the measured force is corrected according to the sine function, illustrated in FIG. 9b. Suitable sensors are as follows:

Hall Sensor: A Hall sensor is pushed together with the force sensor into the measuring body. The angular position is detected together with a magnet which is fixed on the hook.
optical sensor
potentiometer having a resistance path and a slider.

Figure 10A:
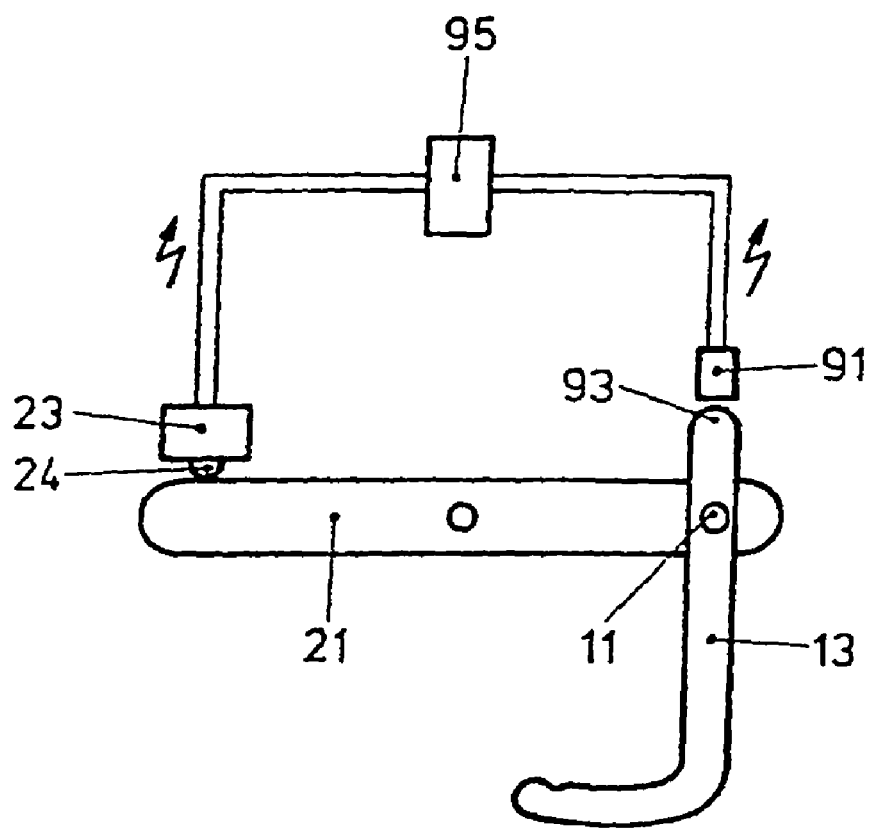
FIGS. 10a and 10b show a further compensation variant using a Hall sensor.
Figure 10B:
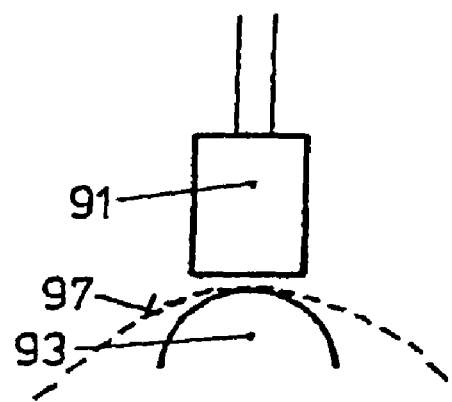

FIGS. 10a and 10b show the arrangement of an above-mentioned Hall sensor 91, by means of which the deviation from the position of the weighing element 13 can be determined. FIG. 10a shows that the Hall sensor 91 is arranged opposite the end region 93 of the weighing element 13, this end region 93 being magnetic. If the weighing element 13, as is illustrated in FIG. 10b, now moves with the end region 93 along the line 97 about the spindle 11, this deviation from the central position is detected by the Hall sensor. On the other hand, however, the weight suspended on the weighing element is of course also transmitted by the transmission element 21 to the measuring sensor 23 or detected by said measuring sensor 23. The two values detected by the Hall sensor 91 and the measuring sensor 23 are combined in a microprocessor 95, and the weight detected in the measuring sensor 23 is correspondingly corrected by the deviation of the element 13. The arrangement of a Hall sensor means that it is thus no longer necessary for there to be any rocking, as described with reference to FIGS. 9a and 9b.

However, it is also possible to envisage mechanical compensation. In this method, the point of action for the lever transmission is moved, up to a certain degree, depending on the angled position of the hook.

Figure 11:
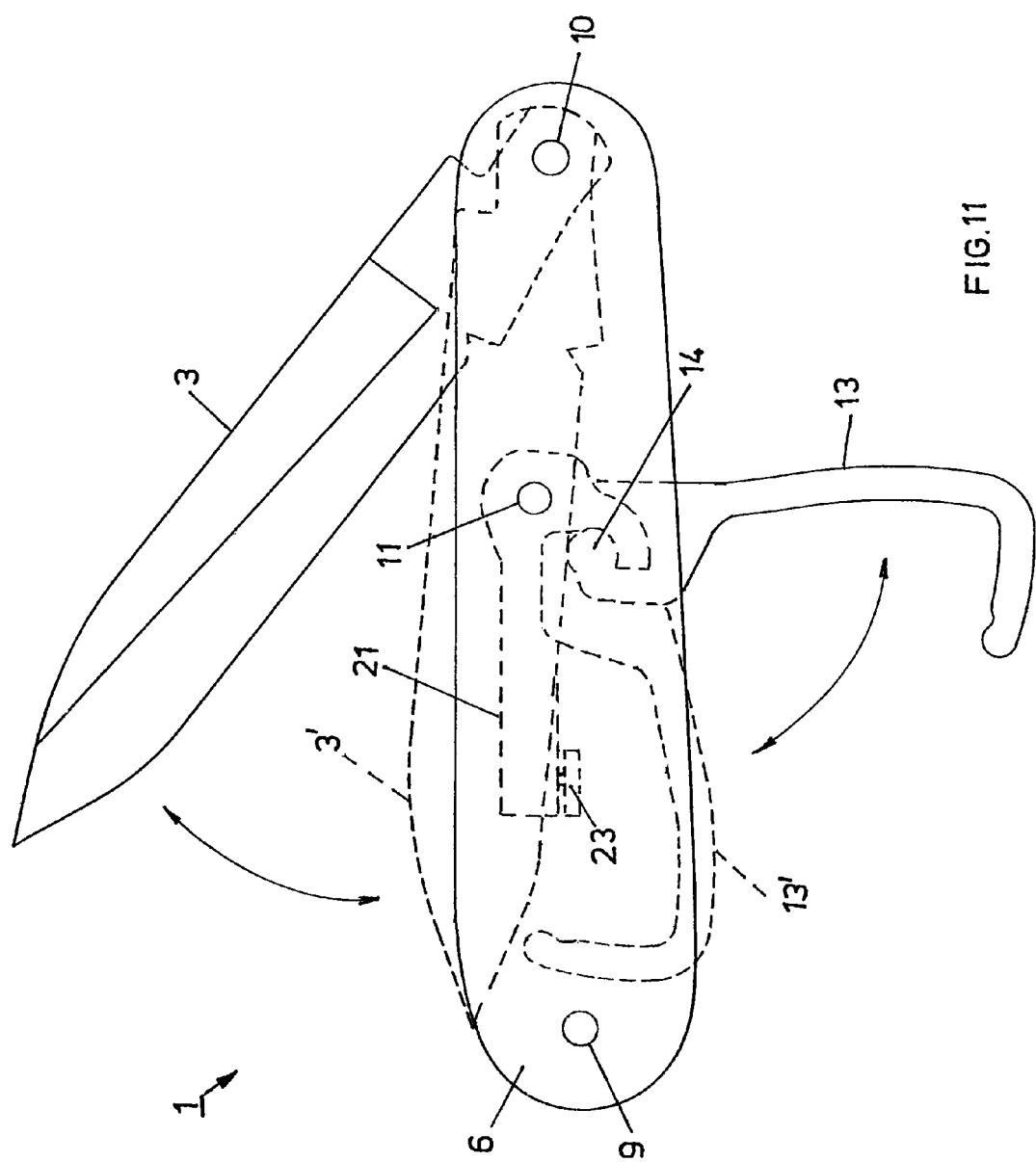
FIG. 11 is a cross-section view illustrating the knife blade foldably secured by one of the mounting spindles.

FIG. 11 illustrates knife blade 3 foldably secured by mounting spindle 10 to allow knife blade 3 to pivot about mounting spindle 10.

The embodiment illustrated in FIGS. 1 to 11 and elements according to the invention are of course only examples which can be altered or modified in any desired manner or which can be replaced by further elements. The fundamental purpose of the figures is to explain the present invention in more detail using examples. In particular, the precise arrangement of the various elements, the selection of the measuring sensor system, the evaluation electronics, the display, the design of the pocket knife itself etc. can be modified in any desired manner within the scope of the present invention.

The invention claimed is:

1. A pocket knife for measuring a weight of a load suspended therefrom, the pocket knife comprising:
   a body;
   at least one cutting tool or blade positioned and configured to be folded out of the body;
   a side cover of the body covering at least one side of the at least one cutting tool or blade;
   at least three mounting spindles positioned and configured to foldably secure the at least one cutting tool or blade to the body and operable to lock the cutting tool in a folded-in or folded-out position with respect to the body;
   a measuring sensor positioned at the body and operable to measure the weight; and
   a transmission arrangement configured to pivot about one spindle of the at least three mounting spindles;
   a weighing element mounted to the body such that the weighing element is foldable out of the body, the weighing element being configured to receive the load and to transmit to the transmission arrangement in a first force direction the weight of the load; and
   the transmission arrangement configured to change a force direction of the load from the first force direction to a torque force rotating about the one spindle by the pivoting about the one spindle when the weighing element receives the load,
   wherein the measuring sensor is operatively connected to the weighing element by the transmission arrangement for transmitting the torque force as the weight of the load directly to the measuring sensor.

2. The pocket knife as claimed in claim 1, wherein the transmission arrangement includes a lever element having a first end and a second end, the lever element positioned and configured to be at least operatively connected to the weighing element in order to transmit the weight to the measuring sensor by the first end of the lever element moving down and the second end moving up in a lever manner in response to the weight transmitted.

3. The pocket knife as claimed in claim 1, wherein the weighing element is foldable out of the body about one spindle of the at least three mounting spindles.

4. The pocket knife as claimed in claim 3, wherein the weighing element is mounted to one spindle of the at least three mounting spindles such that the weighing element, according to the weight of the load, moves transversely to the spindle within a pre-specified distance.

5. The pocket knife as claimed in claim 1, wherein the weighing element and the transmission arrangement are mounted in such a manner that there is no or little friction resisting their movement relative to the body.

6. The pocket knife as claimed in claim 5, wherein the weighing element and the transmission arrangement are mounted by bearings selected from the group consisting of friction bearings, ball bearings and flexural bearings.

7. The pocket knife as claimed in claim 1, wherein the weighing element and the transmission arrangement are mounted in a resilient manner wherein the transmission element is connected to a retaining element via a resilient mounting spindle.

8. The pocket knife as claimed in claim 1, further comprising a measuring arrangement for detecting an angular position of the weighing element based on a longitudinal axis of the knife body.

9. The pocket knife as claimed in claim 8, wherein the measuring arrangement is selected from the group consisting of a Hall sensor, an optical sensor and a potentiometer having a resistance path and a slide.

10. The pocket knife as claimed in claim 1, further comprising an evaluation microprocessor operable for receiving data detected by the measuring sensor and transmitted to the microprocessor in wireless fashion.

11. The pocket knife as claimed in claim 1, further comprising evaluation electronics connected to the measuring sensor operable to determine the measured weight.

\* \* \* \* \*